June 22, 1943. R. C. CHURCHMAN 2,322,347
NUT LOCK
Filed March 9, 1942

INVENTOR.
R. C. CHURCHMAN
BY Corey and Fletcher

Patented June 22, 1943

2,322,347

UNITED STATES PATENT OFFICE 2,322,347

NUT LOCK

Russell C. Churchman, Des Moines, Iowa

Application March 9, 1942, Serial No. 433,855

3 Claims. (Cl. 70—232)

The principal object of my invention is to provide a nut lock which will incase the nut used in securing a wheel to an automotive vehicle and thereby prevent the unwarranted removal of the nut.

A further object of this invention is to provide a nut lock which utilizes the standard nut supplied with the automotive vehicle thereby eliminating the purchase or construction of a special nut for securing a wheel to a car.

A still further object of my invention is to provide a universally adaptable nut lock that is extremely economical in manufacture, durable and efficient in use.

These and other objects will be apparent to those skilled in the art.

My invention consists in the construction, arrangement and combination of the various parts of the device, whereby the objects contemplated are attained as hereinafter more fully set forth, pointed out in my claims, and illustrated in the accompanying drawing, in which:

Figure 1:
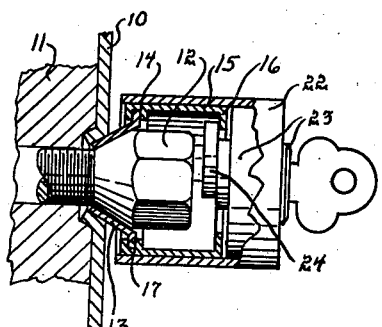
Fig. 1 is a side cross sectional view of my complete nut lock in place and ready for use.
Figures 2, 3:
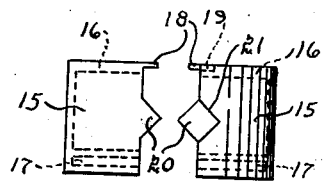
Fig. 2 is a side elevational view of one-half of the locking shell.
Fig. 3 is an elevational view of the other half of the locking shell.
Figures 4, 5:
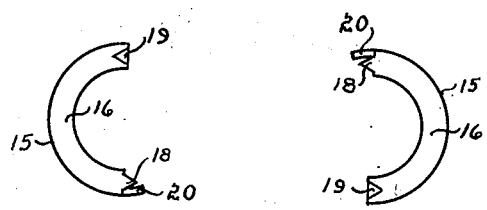
Fig. 4 is a top plan view of one of the halves of the locking shell.
Fig. 5 is the top plan view of the other half of the locking shell.

Previous nut locks have relied mainly on a special nut which had to be fabricated to various sizes to fit the threads or stud bolts of a vehicular wheel. This made it necessary to fabricate or manufacture a great number of different sizes of locks and prevented a standardized production of one size of nut locking devices. I have overcome such disadvantages as will be appreciated, and as will hereinafter be more fully set forth.

Referring to the drawing, I have used the numeral 10 to designate the wheel portion of an automotive vehicle which is secured to the brake drum or like through the medium of a stud bolt 12. It is to such a wheel and nut or stud bolt 12 that I feel my device is of use. This device I will now describe:

I have used the numeral 13 to designate a washer or adapter which fits the conventional slope of a stud bolt or nut and has thereon a peripheral rim 14. The numeral 15 designates a shell member having upper rim 16 and internal groove 17 as shown in Fig. 1 of the drawing. The numeral 18 designates a lug formed on the end portion of the flange portion 16. The other end of the flange 16 has therein a recess 19. The numeral 20 designates a lug on the side wall of the sleeve or collar 15 and on the other side wall is a recessed notch 21. By this structure two of the members 15 may be placed together in the manner shown in Figs. 2, 3, 4, and 5 so that the lug 20 of each of the halves fits into the notches 21 of the other half and the lugs of 18 of one-half fit into the recesses 19 of the first half. Thus when the two halves are placed together they form an inter-lock cylinder. In use the two halves 15 are put together so that the groove 17 engages the peripheral flange or rim 14 of the adapter 13 as shown in Fig. 1.

The numeral 22 indicates a cylinder capable of embracing the two inter-locked halves of the shells 15. The numeral 23 designates an ordinary key operating lock secured within the closed end of the cylinder or housing 22 and having thereon the locking cam 24 as shown in the drawing. This cam when in an unlocked position will enter the inside of the cylinder composed of the two shells 15 and may then be locked over the rim 16, as shown in Fig. 1, which permits the housing 22 to rotate and the cylinder formed of the shells 15 to rotate preventing the actuation of the nut or stud bolt 12.

Figure 6:
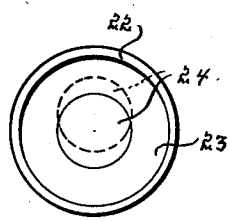
Fig. 6 is a rear end view of the rotating cylinder or housing of the device and more fully illustrates one of the elements of Fig. 1.
Figure 7:
Fig. 7 is a side elevational view of the adapter washer of the device.

The practical operation of my device is as follows: The stud bolt or nut 12 is removed from the car wheel and the washer 13 is imposed in the wheel recess after which the nut or bolt 12 is replaced. The two halves or shells 15 are fitted over the peripheral rim and interlocked, as herebefore explained to form an enclosing sectional cylinder which is free to rotate on the rim 14. The housing or cylinder 22 is then slipped over the shell formed of the halves 15 so that when the key of the lock 23 is turned to the position shown by dotted lines in Fig. 6, the shell 15 and housing 22 can be rotated but are held against removal from the adapter 13.

Thus the whole casing rotates and it is impossible to actuate by wrench, or other means, the nut or bolt 12.

The adapter ring 13 is flexible enough to fit most conventional sizes of rim nut or stud bolt making it unnecessary to fabricate more than a few sizes of locking devices and the whole assembly rotates thereby effectively preventing any removal of the nut to which the unit is attached.

Thus it will be seen I have provided a nut lock structure that fulfills all of my objects, that may be readily adapted to many sizes and kinds of nuts, bolts, or the like, and is light in weight and simple in structure.

Some changes may be made in the construction and arrangement of my improved nut lock without departing from the real spirit and purpose of my invention, and it is my intention to cover by my claims any modified forms of structure or use of mechanical equivalents which may be reasonably included within their scope.

I claim:

1. In a device of the class described, a conical adapter capable of being securely held by a tapered nut or the like, a flange on said adapter, two interlocking semi-cylindrical shell members having an inwardly extending grooved portion adjacent one of their ends for receiving said flange on said adapter when said two shells are interlocked, a flange formed at the other end of said shells, a cylindrical housing capable of enclosing such shell members and holding them in position relative to the adapter flange, and a key rotatable cam member capable of locking over the shell flange and holding said housing in position on said shell members and permitting the rotation thereof.

2. In a nut lock for a tapered nut, a conical washer element capable of being interposed between the nut and the surface held by the nut, a peripheral flange on said washer, two semi-cylindrical shell members having inwardly extending flange portions on each end thereof, said shells being adapted to form a cylinder and having lugs and lug receiving recesses thereon for holding the shells in position adjacent each other, a peripheral groove formed in one of the flanges of said shell members capable of receiving the flange on said washer, a housing enclosing said shell members and holding them in position, and a locking means in said housing capable of engaging the other of the shell flanges to prevent the removal of said housing from said shells and the removal of the shells from the washer flange when said locking means is in a locked position.

3. In a nut lock for a tapered nut, a conical washer element adapted to be placed between the tapered portion of the nut and the surface which it holds, the washer element having a peripheral flange, a pair of keyed semi-cylindrical shells having a flange on each end thereof adapted to be placed around the nut, a groove in the shell flange adjacent the washer flange adapted to receive said washer flange, a cylindrical housing of slightly greater circumference than the shells and adapted to be placed over them, and a lock on the outer portion of said housing, said lock being adapted to grip the inner side of the outer shell flange so that said housing and said shells may be revolved without revolving the nut.

RUSSELL C. CHURCHMAN.